United States Patent
Lu et al.

(10) Patent No.: US 10,088,877 B2
(45) Date of Patent: Oct. 2, 2018

(54) BOARD CARD MODULE

(71) Applicant: Wistron Corporation, New Taipei (TW)

(72) Inventors: Fu-Lung Lu, New Taipei (TW); Cheng-An Lu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/603,474

(22) Filed: May 24, 2017

(65) Prior Publication Data
US 2018/0239403 A1     Aug. 23, 2018

(30) Foreign Application Priority Data
Feb. 23, 2017  (TW) .............................. 106106018 A

(51) Int. Cl.
*G06F 1/18*         (2006.01)
*H01R 12/72*        (2011.01)

(52) U.S. Cl.
CPC .............. *G06F 1/185* (2013.01); *G06F 1/181* (2013.01); *G06F 1/184* (2013.01); *H01R 12/721* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,979,075 A * | 12/1990 | Murphy | .................. | G06F 1/184 29/830 |
| 5,973,918 A * | 10/1999 | Felcman | .................. | G06F 1/184 361/679.6 |
| 7,161,798 B2 * | 1/2007 | Chen | ....................... | G06F 1/184 361/679.32 |
| 8,848,358 B2 * | 9/2014 | Peng | ....................... | G06F 1/185 361/679.31 |
| 9,629,291 B1 * | 4/2017 | Chen | ....................... | G06F 1/185 |
| 2015/0062795 A1 * | 3/2015 | Zhu | .......................... | G06F 1/16 361/679.31 |

FOREIGN PATENT DOCUMENTS

TW          I554192         10/2016

OTHER PUBLICATIONS

"Office Action of Taiwan Counterpart Application," dated Aug. 10, 2017, with English translation thereof, p. 1-p. 5.

* cited by examiner

*Primary Examiner* — Lisa Lea Edmonds
(74) *Attorney, Agent, or Firm* — JCIPRNET

(57) ABSTRACT

A board card module including a case, a main board, and an expansion card is provided. The case has an accommodating space. The main board is fixed to the case and located in the accommodating space. The main board has a connecting port. The expansion card is detachably pivoted to the case and located in the accommodating space. The expansion card has a terminal set and the expansion card is rotatable relative to the case to insert the terminal set into or separate the terminal set from the connecting port.

8 Claims, 4 Drawing Sheets

BOARD CARD MODULE

CROSS-REFERENCE TO RELATED APPLICATION

This application claims the priority benefit of Taiwan application serial no. 106106018, filed on Feb. 23, 2017. The entirety of the above-mentioned patent application is hereby incorporated by reference herein and made a part of this specification.

BACKGROUND OF THE INVENTION

Field of the Invention

The invention relates to a board card module and more particularly relates to a board card module applied to a server or a computer host.

Description of Related Art

In the existing technology, functions of a server or a computer host are mostly expanded through an external expansion card. The electronic components in the server or computer host that is currently available on the market are disposed at very high density and are subject to deficiency of the internal space of the server or computer host, which makes it even more difficult to plug and remove the expansion card. Any carelessness during plugging or removal of the expansion card may also cause damage to the main board or the expansion card.

However, if the size of the housing of the server or computer host is increased to provide space for plugging or removing the expansion card in order to prevent damaging the main board or the expansion card, it does not match the trend of product miniaturization.

SUMMARY OF THE INVENTION

The invention provides a board card module which facilitates assembly and disassembly.

The board card module of the invention includes a case, a main board, and an expansion card. The case has an accommodating space. The main board is fixed to the case and located in the accommodating space. The main board includes a connecting port. The expansion card is detachably pivoted to the case and located in the accommodating space. The expansion card includes a terminal set and the expansion card is rotatable relative to the case so as to insert the terminal set into or separate the terminal set from the connecting port.

In an embodiment of the invention, rotation of the expansion card relative to the case defines a movement path of the terminal set, and the connecting port is located on the movement path of the terminal set.

In an embodiment of the invention, the case further includes a plurality of first positioning posts, a pivot post, and a plurality of second positioning posts located in the accommodating space and protruding from a bottom surface of the case. The main board is fixed to the case through the first positioning posts. The expansion card is pivoted to the case through the pivot post and supported by at least a portion of the second positioning posts.

In an embodiment of the invention, the main board supported by the first positioning posts and the bottom surface are separated by a first distance, and the expansion card supported by the pivot post and the at least a portion of the second positioning posts and the bottom surface are separated by a second distance, and the first distance is equal to the second distance.

In an embodiment of the invention, one of the second positioning posts is close to the connecting port with respect to the pivot post.

In an embodiment of the invention, the expansion card further includes a force applying portion and a pivot portion. The pivot portion is pivoted to the pivot post, and the force applying portion is close to the terminal set with respect to the pivot portion. When the terminal set is inserted into the connecting port, the force applying portion faces one of the second positioning posts.

In an embodiment of the invention, the force applying portion includes a first locking portion and the one of the second positioning posts includes a second locking portion. When the force applying portion faces the one of the second positioning posts, the first locking portion is locked to the second locking portion to fix the main board and the expansion card.

In an embodiment of the invention, the force applying portion is a screw, and the expansion card has a first screw hole while the one of the second positioning posts has a second screw hole. The screw includes a nut and a screw shaft connected to the nut. The screw shaft is locked to the first screw hole. When the force applying portion faces the one of the second positioning posts, the screw shaft is further screwed into the second screw hole to fix the main board and the expansion card.

In an embodiment of the invention, the case further has an opening communicating with the accommodating space and the expansion card further includes an external connecting port opposite to the terminal set, and the external connecting port is exposed in the opening.

Based on the above, in the board card module of the invention, the expansion card is rotatable relative to the case so as to insert the terminal set of the expansion card into or separate the terminal set of the expansion card from the connecting port of the main board, which facilitates assembly and disassembly.

To make the aforementioned and other features and advantages of the invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
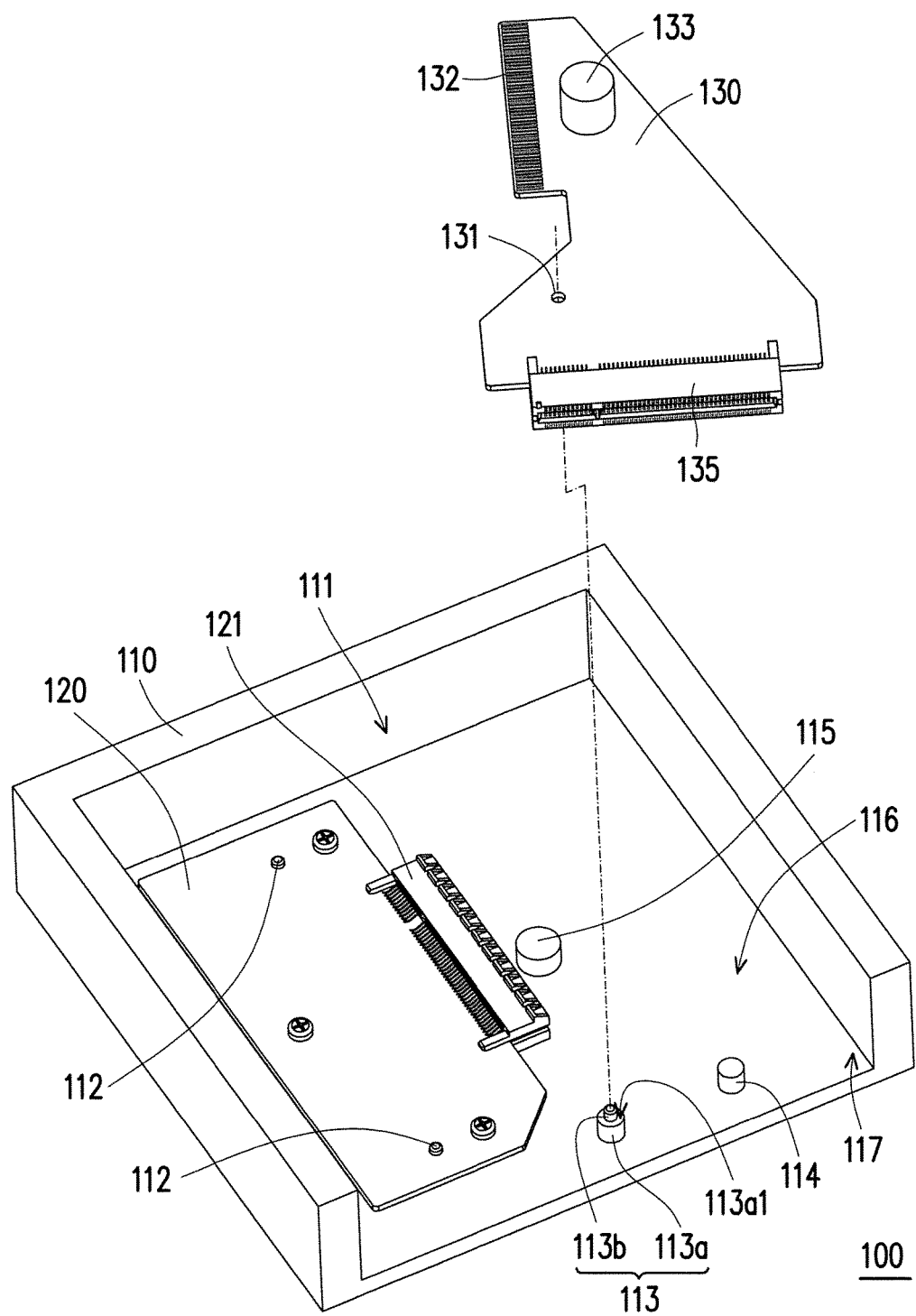
FIG. 1 is a schematic exploded view of a board card module according to an embodiment of the invention.
Figure 2:
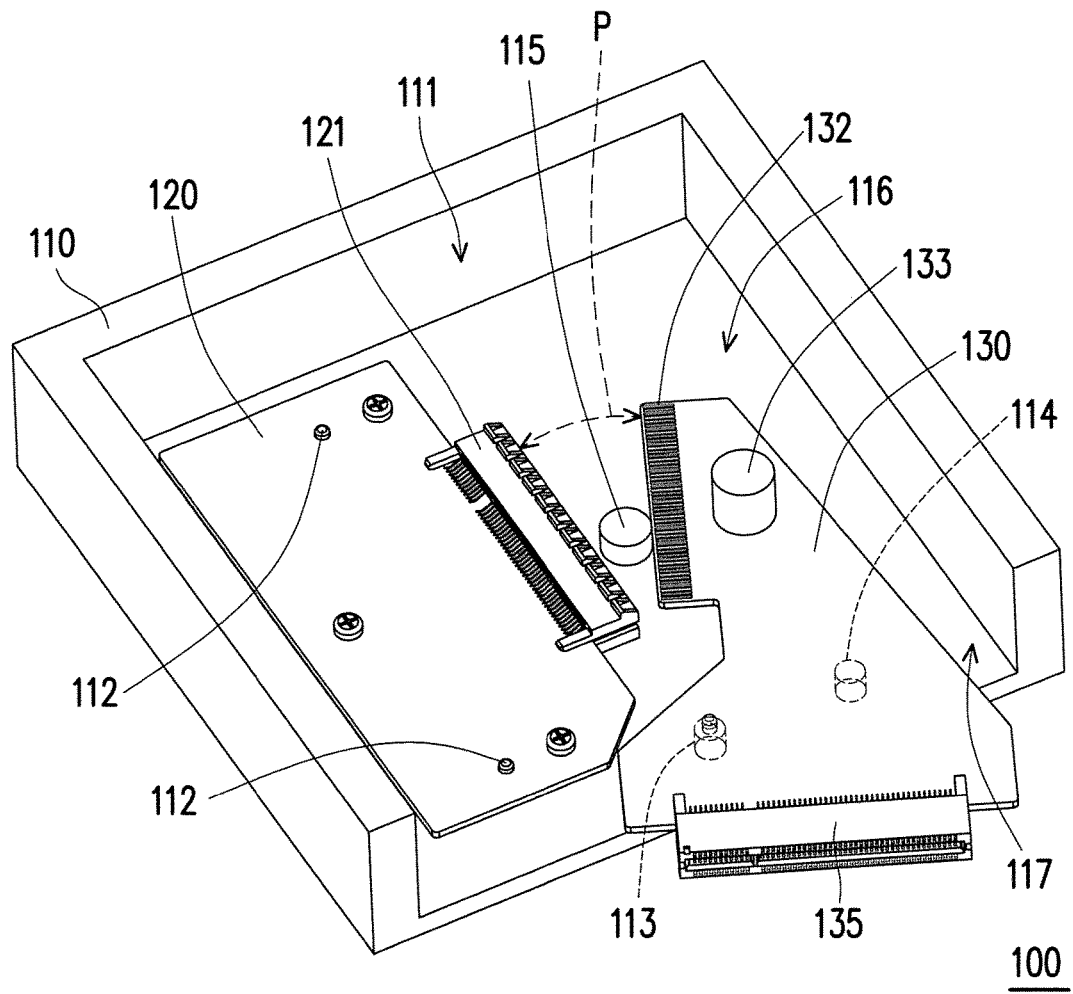
FIG. 2 is a schematic view of assembly of the board card module of FIG. 1.
Figure 3:
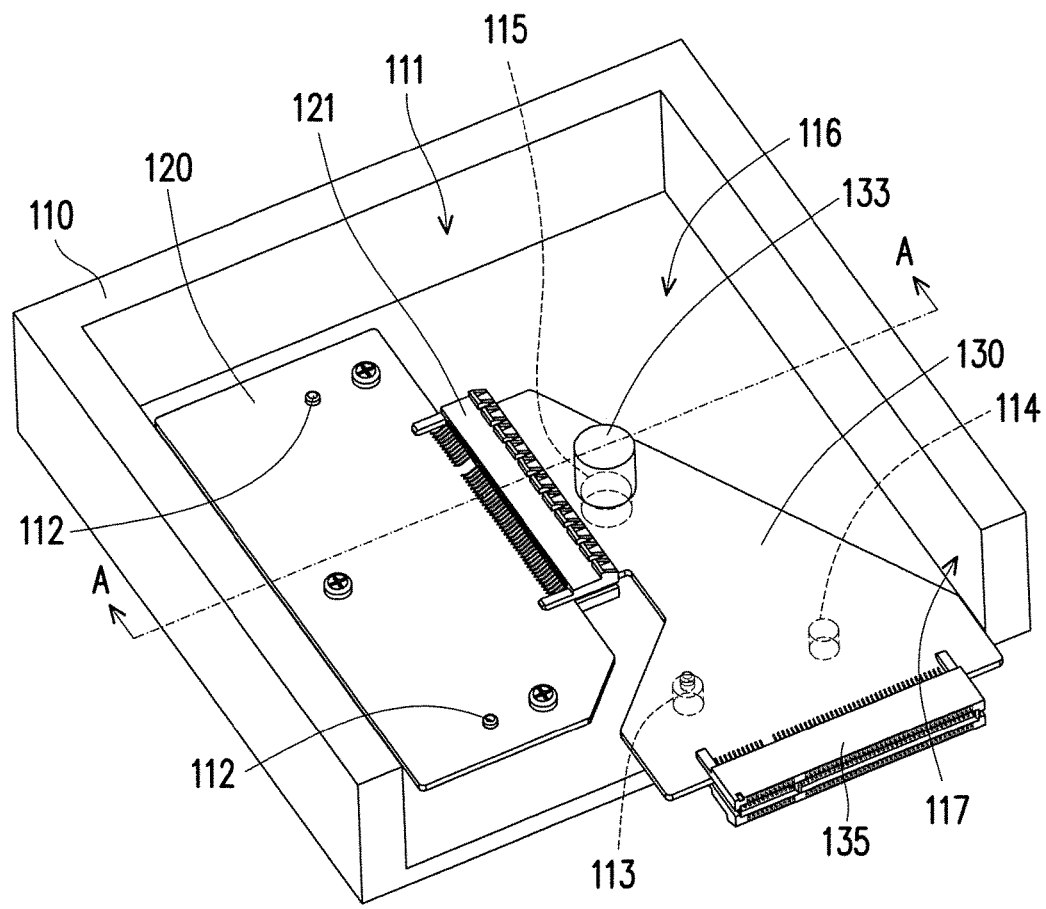
FIG. 3 is a schematic view of an expansion card of FIG. 2 inserted into a main board.
Figure 4:
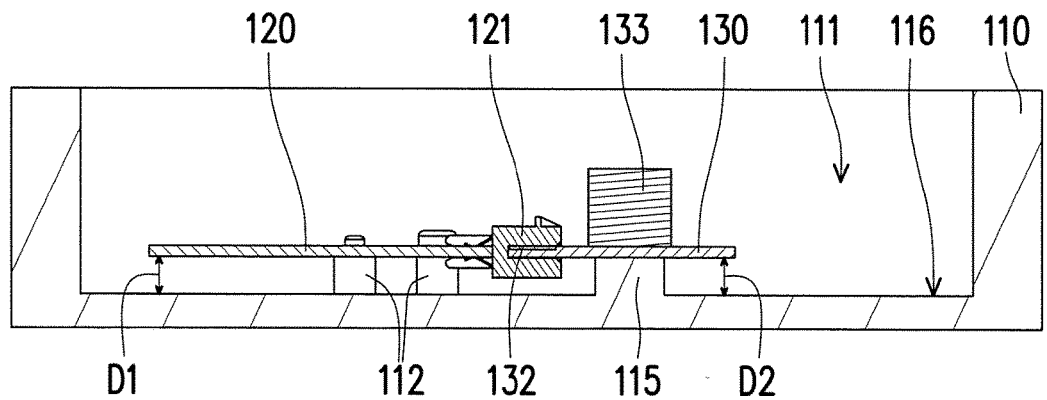
FIG. 4 is a schematic cross-sectional view of the board card module of FIG. 3 along the line A-A.

FIG. 1 is a schematic exploded view of a board card module according to an embodiment of the invention. FIG. 2 is a schematic view of assembly of the board card module of FIG. 1. FIG. 3 is a schematic view of an expansion card of FIG. 2 inserted into a main board. FIG. 4 is a schematic cross-sectional view of the board card module of FIG. 3 along the line A-A. Referring to FIG. 1 to FIG. 4, in this embodiment, a board card module 100 is adapted for a server or a computer host, wherein the board card module 100 includes a case 110, a main board 120, and an expansion card 130. The case 110 may be a portion of a housing of the server or the computer host. The main board 120 may be fastened and fixed to the case 110 by a fastening member (e.g. a screw), wherein the case 110 has an accommodating space 111, and the main board 120 is located in the accommodating space 111. Moreover, the expansion card 130 is detachably pivoted to the case 110 and located in the accommodating space 111.

The case 110 includes a plurality of first positioning posts 112, a pivot post 113, and two second positioning posts 114 and 115. The case 110 illustrated in this embodiment includes two second. positioning posts 114 and 115, for example. Nevertheless, the invention is not limited thereto. In other embodiments, the number of the second positioning posts may be increased as required. Specifically, the first positioning posts 112, the pivot post 113, and the second positioning posts 114 and 115 are located in the accommodating space 111 and protrude from a bottom surface 116 of the case 110. For example, a portion of the first positioning posts 112 have a screw hole respectively. In terms of assembly, the main board 120 is placed on the first positioning posts 112 first with screw holes on the main board 120 aligned with the screw holes of the portion of the first positioning posts 112. Then, the fastening member (e.g., screw) is put through the screw hole on the main board 120 to be screwed into the screw hole of the first positioning post 112, so as to fix the main board 120 onto the first positioning posts 112.

In addition, the expansion card 130 has a pivot portion (i.e., a pivot hole 131) disposed corresponding to the pivot post 113, and the pivot hole 131 of the expansion card 130 is sleeved on the pivot post 113. In the state shown in FIG. 2, the expansion card 130 is supported by the pivot post 113 and the second positioning post 114. Furthermore, the pivot post 113 includes a base portion 113a and a post portion 113b, wherein the base portion 113a is connected to the bottom surface 116 and the post portion 113b is connected to a top surface 113a1 of the base portion 113a. The base portion 113a is located between the post portion 113b and the bottom surface 116, and an outer diameter of the base portion 113a is greater than an outer diameter of the post portion 113b. Because the outer diameter of the post portion 113b is slightly smaller than an inner diameter of the pivot hole 131, the post portion 113b may pass through the pivot hole 131 to put the expansion card 130 against the top surface 113a1 of the base portion 113a. On the other hand, a distance between the top surface 113a1 of the base portion 113a and the bottom surface 116 is equal to a height of the second positioning post 114. Therefore, the expansion card 130 supported by the pivot post 113 and the second positioning post 114 is parallel to the bottom surface 116.

Further, referring to FIG. 1 to FIG. 4, in this embodiment, the main board 120 includes a connecting port 121 while the expansion card 130 includes a terminal set 132 corresponding to the connecting port 121. Moreover, the expansion card 130 is rotatable relative to the case 110 to define a movement path P of the terminal set 132. Because the connecting port 121 is located on the movement path P, rotation of the expansion card 130 relative to the case 110 causes the terminal set 132 to be inserted into the connecting port 121 or separated from the connecting port 121. The operation is easy for the user no matter the user assembles/disassembles the expansion card 130 to/from the case 110, or inserts/separates the terminal set 132 into/from the connecting port 121.

In addition, a height of each of the first positioning posts 112, the distance between the top surface 113a1 of the base portion 113a and the bottom surface 116, the height of the second positioning post 114, and a height of the second positioning post 115 are equal to one another. Therefore, a first distance D1 between the main board 120 supported by the first positioning posts 112 and the bottom surface 116 is equal to a second distance D2 between the expansion card 130 supported by the pivot post 113 and the second positioning post 114 and the bottom surface 116. In other words, a vertical height of the terminal set 132 with reference to the bottom surface 116 is equal to a vertical height of an interface of the connecting port 121 with reference to the bottom surface 116. Accordingly, damage to the terminal set 132 or the connecting port 121, which may occur as the expansion card 130 is rotated to insert the terminal set 132 into the connecting port 121 or separate the terminal set 132 from the connecting port 121, may be prevented.

In this embodiment, the expansion card 130 includes a force applying portion 133 opposite to the pivot hole 131, wherein the force applying portion 133 is located at a side of the expansion card 130 away from the bottom surface 116, and the force applying portion 133 is close to the terminal set 132 with respect to the pivot hole 131. For example, the user may apply a force on the force applying portion 133 to rotate the expansion card 130 around the pivot hole 131 as an axis relative to the case 110. Because the force applying portion 133 is close to the terminal set 132 with respect to the pivot hole 131, the user may save more efforts when performing the operation. On the other hand, when the terminal set 132 is inserted into the connecting port 121, the force applying portion 133 faces the second positioning post 115. In other words, in the state shown in FIG. 3, the expansion card 130 is supported by both the pivot post 113 and the second positioning posts 114 and 115.

Moreover, the case 110 has an opening 117 communicating with the accommodating space 111, wherein the expansion card 130 includes an external connecting port 135 opposite to the terminal set 132, and the external connecting port 135 is exposed in the opening 117. Accordingly, an external power connector or signal connector may be inserted into the external connecting port 135 for power or signal transmission.

Some other embodiments of the invention are provided as follows. It should be noted that the reference numerals and part of the contents of the previous embodiment are used in the following embodiments, in which identical reference numerals indicate identical or similar components, and descriptions of the same technical contents are omitted. Please refer to the description of the previous embodiment for the omitted contents, which will not be repeated hereinafter.

Figure 5:
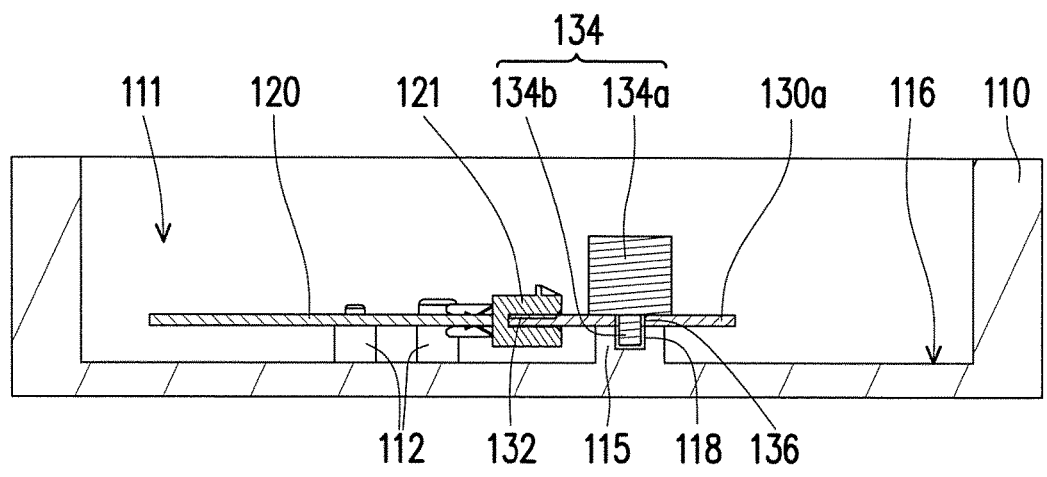
FIG. 5 is a schematic cross-sectional view of a board card module according to another embodiment of the invention.

FIG. 5 is a schematic cross-sectional view of a board card module according to another embodiment of the invention. Referring to FIG. 5, a board card module 100A is similar to the board card module 100 of the embodiment described above, and a difference between the board card module 100A and the board card module 100 is that: a force applying portion 134 of this embodiment is a screw, wherein an expansion card 130a has a first screw hole 136 while a second positioning post 115a has a second screw hole 118 (or called a second locking portion). The force applying portion 134 includes a nut 134a and a screw shaft 134b (or called a first locking portion) connected to the nut 134a. The screw shaft 134b (or called the first locking portion) is fastened and locked to the first screw hole 136. When the force applying portion 134 faces the second positioning post 115a, the user may turn the nut 134a to fasten the screw shaft 134b (or called the first locking portion) further into the second screw hole 118 (or called the second locking portion), so as to fix the main board 120 and the expansion card 130a.

To conclude the above, in the board card module of the invention, the expansion card is detachably pivoted to the case and therefore is rotatable relative to the case to insert the terminal set of the expansion card into or separate the terminal set of the expansion card from the connecting port of the main board. The operation is convenient and easy for the user no matter the user assembles/disassembles the expansion card to/from the case, or inserts/separates the terminal set into/from the connecting port. Moreover, because the first distance between the main board and the bottom surface of the case is equal to the second distance between the expansion card and the bottom surface of the case, damage to the terminal set or the connecting port, which may occur as the expansion card is rotated to insert the terminal set into or separate the terminal set from the connecting port, may be prevented.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A board card module, comprising:
    a case, having an accommodating space;
    a main board, fixed to the case and located in the accommodating space, wherein the main board comprises a connecting port; and
    an expansion card, detachably pivoted to the case and located in the accommodating space,
    wherein the expansion card comprises a terminal set and the expansion card is rotatable relative to the case to insert the terminal set into or separate the terminal set from the connecting port,
    wherein the case further comprises a plurality of first positioning posts, a pivot post, and a plurality of second positioning posts located in the accommodating space and protruding from a bottom surface of the case, and the main board is fixed to the case through the first positioning posts, and the expansion card is pivoted to the case through the pivot post and supported by at least a portion of the second positioning posts.

2. The board card module according to claim 1, wherein rotation of the expansion card relative to the case defines a movement path of the terminal set, and the connecting port is located on the movement path of the terminal set.

3. The board card module according to claim 1, wherein the main board supported by the first positioning posts and the bottom surface are separated by a first distance, and the expansion card supported by the pivot post and the at least a portion of the second positioning posts and the bottom surface are separated by a second distance, wherein the first distance is equal to the second distance.

4. The board card module according to claim 1, wherein one of the second positioning posts is close to the connecting port with respect to the pivot post.

5. The board card module according to claim 4, wherein the expansion card further comprises a force applying portion and a pivot portion pivoted to the pivot post, wherein the force applying portion is close to the terminal set with respect to the pivot portion, and when the terminal set is inserted into the connecting port, the force applying portion faces one of the second positioning posts.

6. The board card module according to claim 5, wherein the force applying portion comprises a first locking portion and the one of the second positioning posts comprises a second locking portion, and when the force applying portion faces the one of the second positioning posts, the first locking portion is locked to the second locking portion to fix the main board and the expansion card.

7. The board card module according to claim 5, wherein the force applying portion is a screw, and the expansion card has a first screw hole while the one of the second positioning posts has a second screw hole, wherein the screw comprises a nut and a screw shaft connected to the nut, and the screw shaft is locked to the first screw hole, and when the force applying portion faces the one of the second positioning posts, the screw shaft is further screwed into the second screw hole to fix the main board and the expansion card.

8. The board card module according to claim 1, wherein the case further has an opening communicating with the accommodating space and the expansion card further comprises an external connecting port opposite to the terminal set, and the external connecting port is exposed in the opening.

* * * * *